July 18, 1950 — M. C. HABER ET AL — 2,515,300

HEATING APPARATUS FOR BONDING METALS

Filed July 3, 1946 — 2 Sheets-Sheet 1

Inventors
Max C. Haber
William B. Baker
Lloyd J. Schnavely
By Thos. E. Scofield
Attorney INVENTORS.
Max C. Haber
William B. Baker
Lloyd J. Schnavely
BY Thos. E. Scofield
ATTORNEY.

Patented July 18, 1950

2,515,300

UNITED STATES PATENT OFFICE 2,515,300

HEATING APPARATUS FOR BONDING METALS

Max C. Haber, Omaha, Nebr., William B. Baker, Council Bluffs, Iowa, and Lloyd J. Schnavely, Cheyenne, Wyo.

Application July 3, 1946, Serial No. 681,229

3 Claims. (Cl. 263—4)

The present invention relates in general to heating apparatus and more particularly to an improved method and apparatus for bonding metals.

Couplings frequently are employed to join different sections of pipe or tubing, a sleeve being provided on the end of each pipe section to cooperate with the coupling member in securing the two sections to one another. The problem of satisfactorily bonding a sleeve to the end of a pipe section for this purpose or for any other purpose has presented great difficulty in the past, and it has not been unusual for the bond to fail when subjected to vibration or when employed on a rather high pressure pipe line.

It is the primary object of the present invention therefore to provide an apparatus and method whereby better bonds between short sleeves and somewhat longer sections of pipe or tubing may be secured.

Another object is to provide a heating apparatus which is simple to operate and which provides uniformly good results even in the hands of a relatively inexperienced operator. Further in this connection, it is an object of the invention to provide an improved arrangement for heating the sleeve which is to be bonded to the tube uniformly throughout its length and circumference.

Another object is to provide a bonding apparatus which will handle sleeves and tubing of different diameters and different lengths.

Another object is to provide a gaseous fuel burner of improved construction.

Another object is to provide a method and apparatus whereby the bonding material may be set quickly by cooling it after the heating thereof.

Other and further objects of the invention will appear in the course of the following description.

Figure 1:
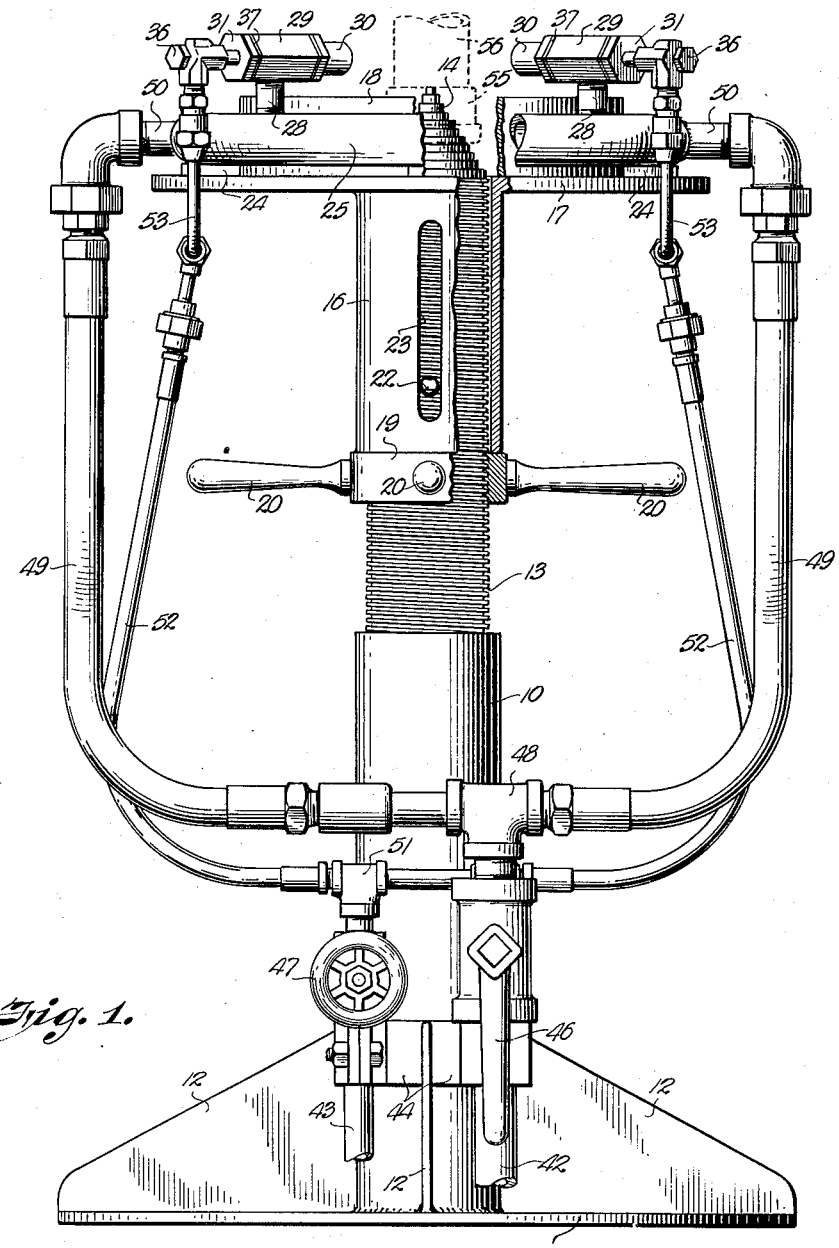
Figure 4:
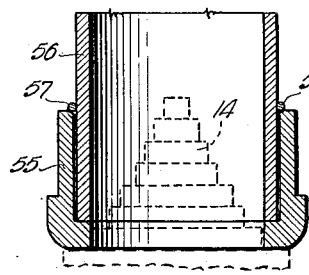
Figure 2:
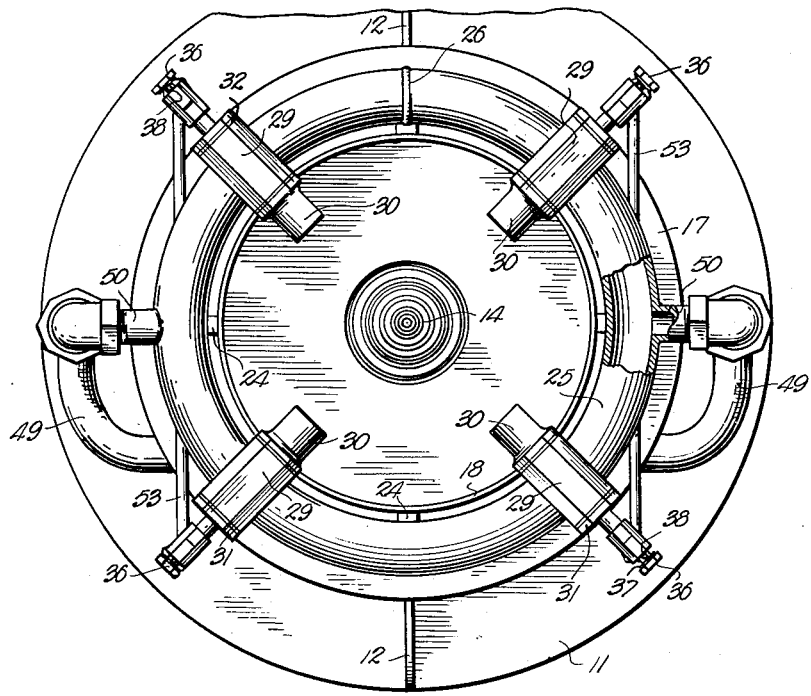
Figure 3:
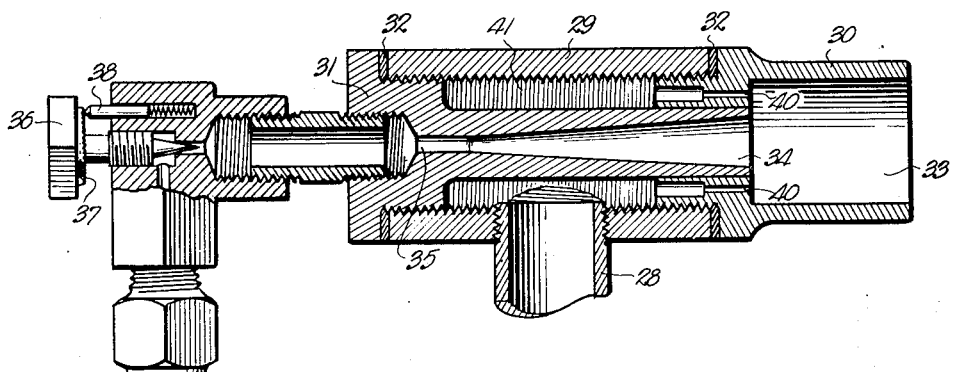

In the accompanying drawings which form a part of the specification and are to be read in conjunction therewith, and in which like reference numerals are employed to indicate like parts of the various views, Fig. 1 is a side elevation of our bonding apparatus, part having been cut away for purposes of illustration, Fig. 2 is a top elevation of our apparatus, part having been cut away for purposes of illustration, Fig. 3 is an enlarged view of one of the burners showing same partly in elevation and partly in cross section, and Fig. 4 is an enlarged cross sectional view of the end of a pipe with a sleeve in proper position to be bonded thereto.

Referring more particularly to the drawings, our apparatus comprises a stationary central pedestal 10 supported in a vertical position on a circular base plate 11 by means of braces 12. Conveniently this pedestal may be formed of large diameter seamless steel tubing or the like welded at its lower end of the base plate and to the braces. Approximately the upper half of the pedestal is threaded as shown at 13, and topping the pedestal is a case hardened structure 14 which hereinafter will be referred to as the pipe sleeve cone.

This "cone" comprises a unitary member formed as a series of concentric cylindrical sections of progressively smaller diameter pyramided one above another. It may be held in position on the pedestal in any desired way; preferably, however, it is provided with a shank just small enough to slide down into the hollow upper end of said pedestal to maintain the cone centered while the largest section thereof rests on the upper end of the pedestal. When thus mounted the pipe sleeve cone may be removed and replaced easily, simply by lifting it on and off of the pedestal.

Supported on the pedestal is an adjustable burner carriage comprising a vertical sleeve 16, a circular plate or flange 17 rigidly affixed to the upper end of the sleeve, for instance by welding, and a cylindrical apron 18 rigidly affixed to the upper side of the plate in a similar fashion. The weight of the carriage is carried by an internally threaded collar 19 on the pedestal, which collar is rotatable by means of radial handles 20 to raise and lower the carriage. A stud 22 projecting outwardly from the pedestal into an elongated slot 23 in the sleeve 16 prevents rotation of the burner carriage and limits the vertical movement thereof.

Four lugs 24 will be noted on the burner carriage. On these rests an annular gas manifold 25 formed of seamless tubing bent to form a circle and having its two ends welded at 26. The manifold may be rigidly affixed to the carriage by welding it to said lugs after it has been centered with respect to the axis of the pedestal.

Four burners, the construction of which may best be seen in Fig. 3, are supported on the gas manifold by means of short vertical pipes 28. Each of these comprises an internally threaded shell 29 having a nozzle 30 screwed into one end thereof and having an air tube 31 screwed into the opposite end as shown. Gaskets 32 of copper or other suitable material are provided between the ends of the shell and the respective end pieces.

The nozzle 30 contains a combustion chamber 33, the rear wall of which has a central aperture for receiving the forward end of the air tube.

The bore 34 of this tube tapers back to the throat 35. A needle valve which may be adjusted by means of a knob 36 controls the supply of air, a ratchet 37 and a holding pawl 38 being provided to prevent accidental changes in the valve setting. In the rear wall of the combustion chamber are a series of small orifices 40 arranged in a ring around the mouth of the air tube. These communicate with an annular chamber 41 which receives gas through pipe 28 from the circular manifold 25. The number of orifices 40, as well as the size of the individual orifices and the dimensions of the combustion chamber, may be varied to suit the type of gas being employed as fuel.

Near the base of our apparatus a gas supply line 42 and an air or oxygen line 43 are rigidly secured to the pedestal by means of a bracket 44. Cut off valves are provided in both lines, the gas valve being operated by a lever 46 and the air valve being controlled by a handle 47. When the gas valve is open fuel flows upwardly therethrough, thence through the T-connection 48 and the two flexible hoses 49 to the input pipes 50 on opposite sides of the gas manifold. Similarly, when the other valve is open air under pressure flows from pipe 43 into the T-connection 51 and thence upwardly through the two flexible hoses 52. The upper end of each of the latter hoses is connected to the mid point of a U-shaped distribution pipe 53, the two ends of which are connected respectively to the needle valves of two burners.

The manner in which our apparatus is used now will be described. Assuming that it is desired to bond a sleeve 55 to the end of a tube or pipe 56, the two are arranged with respect to one another as shown in Fig. 4 and are inverted over the pipe sleeve cone 14 as indicated in Figs. 1 and 4.

The outside diameters of the various sections of this cone conform with the inside diameters of the various pipe sizes encountered in practice, whereby the cone will center and support pipes and sleeves of many different sizes.

Next, by means of handles 29 the burner carriage is raised or lowered until the nozzles of the burner are level with the horizontal center line of the sleeve which is to be bonded to the pipe. With a sleeve of the size indicated by dotted lines in Fig. 1 it will be clear that the burners must be lowered somewhat from the position in which they are shown.

It is essential, of course, that the inner surface of the sleeve and the outer surface of the pipe be absolutely clean and that these surfaces be covered with a suitable bonding flux. One flux found to be satisfactory has the following composition:

|  | Per cent |
|---|---|
| Borax | 24.78 |
| Boric Acid | 16.75 |
| Potassium fluoride | 33.27 |
| Lead acetate | .30 |
| Water | 24.90 |

A predetermined amount of bonding material 57 is arranged in a ring around the pipe next to the upper end of the sleeve and then the four burners are lighted. The bonding material may vary in composition, but one suitable form has the following constituents:

|  | Per cent |
|---|---|
| Silver | 49 to 51 |
| Copper | 14.5 to 15.5 |
| Zinc | 14.5 to 18.5 |
| Cadmium | 17 to 19 |

The arrangement of burners around the sleeve at the level described produce an equal distribution of heat over the entire circumference and height of the sleeve, the best bonding temperature being within the range 1200° to 1650°. When fusion of the bonding metal has taken place the gas is shut off quickly by means of the lever 46, the air being allowed to blow on the sleeve for a short time thereafter in order to quickly cool and set the bonding material.

Laboratory tests reveal that bonds made by the above process are stronger than the tensile strength of a tube equal in wall thickness to two and one-half times the thickness of the sleeve. Furthermore, a bond equal in depth to the thickness of the tubing is equal to the strength of the tubing bonded. If it should be found, however, upon inspection of the interior wall of the tube that the bond does not witness the full circumference around the shelf provided at the bottom of the sleeve, the pipe and sleeve should be replaced in the heating apparatus and the above described operation repeated; the temperature of the gas flame of the burner is such that repeated heating of the pipe and sleeve does not damage the metal or destroy the strength of the bond.

While four burners have been shown for the purposes of illustration it will be understood that a different number may be employed. Where sleeves of very large diameter are to be bonded to pipes, for instance, it may be desirable to employ more burners in order to obtain a uniform distribution of heat around the entire circumference of the sleeve. Other modifications are also possible, and inasmuch as many embodiments of the invention may be made without departing from the scope thereof, it is to be understood that all matter herein set forth or shown in the accompanying drawings is to be interpreted as illustrative and not in a limiting sense.

From the foregoing it will be seen that this invention is one well adapted to attain all the ends and objects herein set forth together with other advantages which are obvious and which are inherent to the apparatus.

It will be understood that certain features and subcombinations of utility may be employed without reference to other features and subcombinations. This is contemplated by, and is within the scope of, the claims.

Having thus described our invention, we claim:

1. Heating apparatus comprising an externally threaded stationary pedestal upon the upper end of which a workpiece is adapted to rest, an internally threaded collar on said pedestal, handles on said collar for rotating same to move the collar up or down on said pedestal at will, a rigid carriage having a central hollow shank encircling said pedestal and resting on said collar, and a plurality of burners supported by said carriage and directed toward the axis of said pedestal.

2. Heating apparatus comprising an externally threaded stationary pedestal upon the upper end of which a workpiece is adapted to rest, an internally threaded collar on said pedestal, handles on said collar for rotating same to move the collar up or down on said pedestal at will, a rigid carriage having a central hollow shank encircling said pedestal and resting on said collar, a sliding pin and slot connection between the carriage and pedestal preventing rotation of said carriage with respect to said pedestal while permitting said carriage to move up or down with said collar, and a plurality of burners supported by said carriage and directed toward the axis of said pedestal.

3. Heating apparatus for bonding sleeves to tubing comprising a base, a stationary pedestal extending upwardly from said base and having at its upper end a tapered structure adapted to center and support sleeves of different diameter, the shank of said pedestal being externally threaded below said upper end, an internally threaded collar encircling the pedestal and meshing with the threaded shank thereof, handles on the collar for rotating same to move the collar up and down on said pedestal, a carriage having a hollow shank encircling the pedestal and resting on the collar, the upper end of said carriage being adjacent the upper end of the pedestal, and a plurality of burners mounted on the upper end of the carriage and directed toward the axis of the pedestal.

MAX C. HABER.
WILLIAM B. BAKER.
LLOYD J. SCHNAVELY.

REFERENCES CITED

The following references are of record in the file of this patent:

UNITED STATES PATENTS

| Number | Name | Date |
|---|---|---|
| 692,376 | Solberg | Feb. 4, 1902 |
| 854,974 | Wieke | May 28, 1907 |
| 964,673 | Mount | July 19, 1910 |
| 1,283,941 | Smith | Nov. 5, 1918 |
| 1,382,002 | Leslie et al. | June 21, 1921 |
| 1,841,692 | Akin et al. | Jan. 19, 1932 |
| 1,953,590 | Cone | Apr. 3, 1934 |
| 1,956,519 | Thomson | Apr. 24, 1934 |
| 1,995,934 | Mangold | Mar. 26, 1935 |
| 2,047,306 | Brookins et al. | July 14, 1936 |

FOREIGN PATENTS

| Number | Country | Date |
|---|---|---|
| 314,280 | Great Britain | June 27, 1929 |